United States Patent
Bondalapati et al.

(10) Patent No.: US 10,524,134 B1
(45) Date of Patent: Dec. 31, 2019

(54) SITE SURVEY TOOL FOR CELLULAR BASE STATION PLACEMENT

(71) Applicant: Facebook, Inc., Menlo Park, CA (US)

(72) Inventors: Pratheep Bondalapati, Woodland Hills, CA (US); Abhishek Tiwari, Oak Park, CA (US); Francesco Marsili, Foster City, CA (US); Qi Tang, North Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/364,083

(22) Filed: Mar. 25, 2019

(51) Int. Cl.
*H04B 17/16* (2015.01)
*H04W 16/18* (2009.01)
*H04B 7/06* (2006.01)
*H04B 17/10* (2015.01)
*H04B 17/14* (2015.01)
*H04B 17/00* (2015.01)

(52) U.S. Cl.
CPC .......... *H04W 16/18* (2013.01); *H04B 7/0639* (2013.01); *H04B 17/0087* (2013.01); *H04B 17/104* (2015.01); *H04B 17/14* (2015.01); *H04B 17/16* (2015.01)

(58) Field of Classification Search
CPC .................................................. H04W 16/18
See application file for complete search history.

(56) References Cited

U.S. PATENT DOCUMENTS

| 6,141,566 | A | 10/2000 | Gerdisch et al. | |
|---|---|---|---|---|
| 6,353,600 | B1 | 3/2002 | Schwartz et al. | |
| 6,397,062 | B1 | 5/2002 | Sessions | |
| 6,888,512 | B1 | 5/2005 | Daigler | |
| 8,774,837 | B2* | 7/2014 | Wright | G08G 1/0965 455/404.1 |
| 2004/0136342 | A1* | 7/2004 | Pedersen | H04W 28/16 370/335 |
| 2006/0084474 | A1 | 4/2006 | Iacono et al. | |
| 2006/0141929 | A1 | 6/2006 | Lockie et al. | |
| 2013/0235807 | A1 | 9/2013 | Lee et al. | |

* cited by examiner

*Primary Examiner* — Michael T Vu
(74) *Attorney, Agent, or Firm* — Brian R. Short

(57) ABSTRACT

Apparatuses, methods, and systems for a site survey tool are disclosed. One site survey tool includes an elevated platform, wherein the elevated platform includes a directionally adjustable beam-forming antenna, wherein the elevated platform operates to adjust an elevation of the adjustable beam-forming antenna, and wherein the elevated platform operates to transmit or receive wireless signals while the directionally adjustable beam-forming antenna changes a beam direction. Further, a ground unit transmits wireless signals to the elevated platform or receives wireless signals from the elevated platform while the directionally adjustable beam-forming antenna changes the beam direction. A signal quality of received wireless signals is measured, and a power azimuth angular spectrum of a surveyed site is estimated based on a known motion of the adjustable beam-forming antenna, a known beam-forming pattern of the adjustable beam-forming antenna, and the measured phase and amplitude of the received wireless signals.

18 Claims, 8 Drawing Sheets

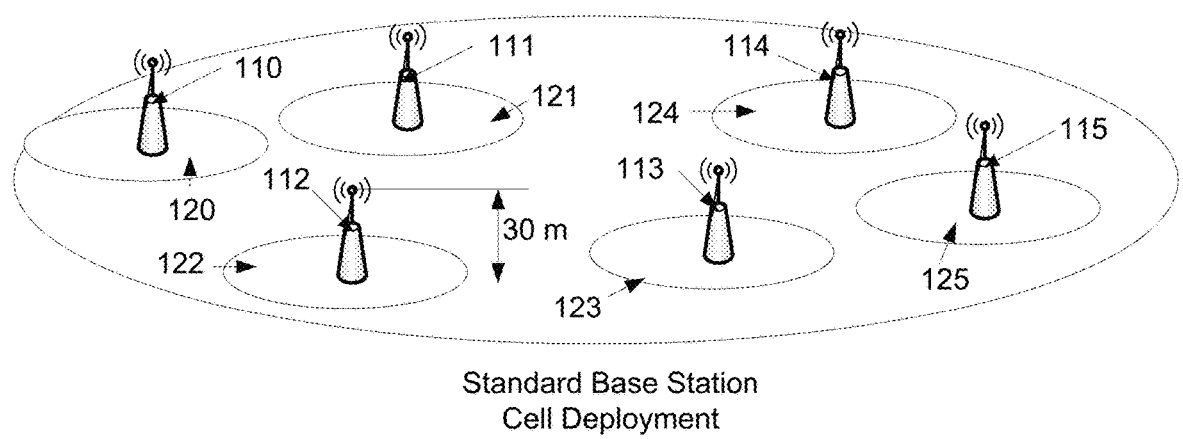
Standard Base Station
Cell Deployment
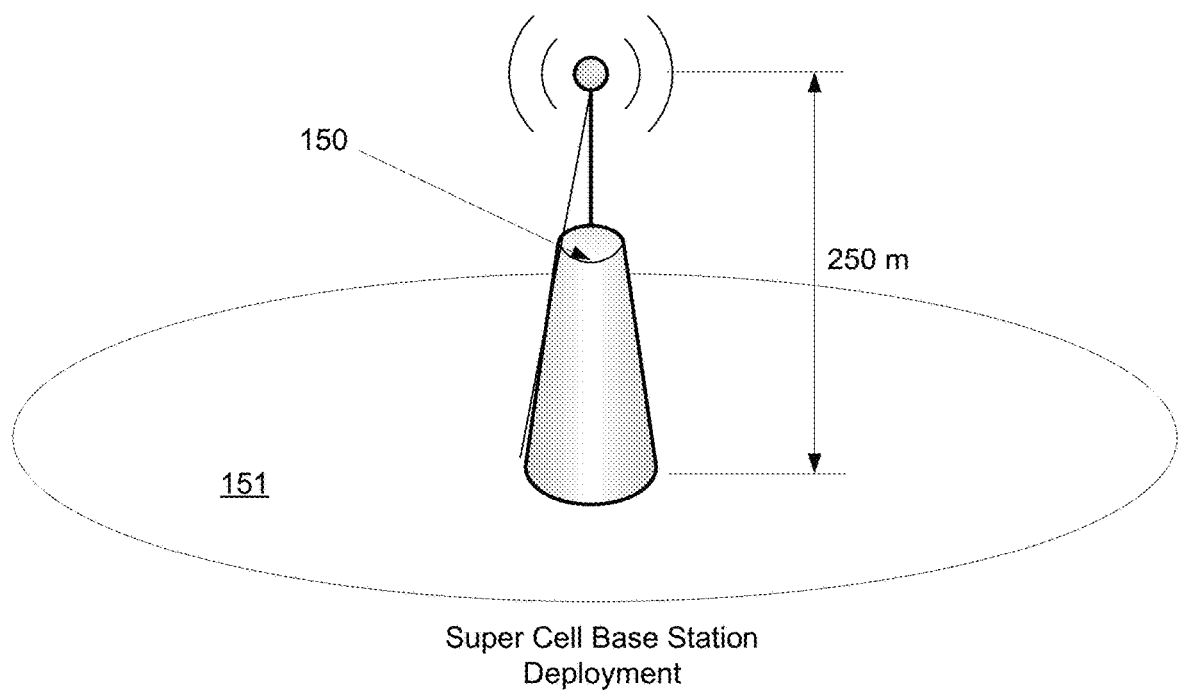
Super Cell Base Station
Deployment
FIGURE 1

Transmitting or receiving, by an elevated platform, wireless signals while a directionally adjustable beam-forming antenna of the elevated platform changes a beam direction, wherein the elevated platform operates to adjust an elevation of the adjustable beam-forming antenna

710

Transmitting or receiving, by a ground unit, wireless signals to or from the elevated platform while the directionally adjustable beam-forming antenna changes the beam direction at a plurality of locations of the ground unit

720

Measuring, by at least one of the elevated platform or the ground unit a signal quality of received wireless signals

730

Estimating an angular spread of a surveyed site based on a known motion of the adjustable beam-forming antenna, a known beam-forming pattern of the adjustable beam-forming antenna, and measure phase and amplitude of the received wireless signals

SITE SURVEY TOOL FOR CELLULAR BASE STATION PLACEMENT

FIELD OF THE DESCRIBED EMBODIMENTS

The described embodiments relate generally to wireless communications. More particularly, the described embodiments relate to systems, methods and apparatuses for surveying a site for cellular base station placement.

BACKGROUND

Large populations around the world lack access to mobile broadband coverage. Typically, these uncovered populations live in remote rural areas of the world characterized by sparse population density, rugged terrain, lack of proper electricity or road infrastructure, low average revenue per user, demand uncertainty due to lack of device access.

Conventional mobile networks typically place base stations on 30-40 meter standard height towers. Providing coverage to large rural regions through the conventional approach requires several standard height towers and base stations. This makes conventional mobile network infrastructure deployment a very costly ordeal. The combination of high cost result in zero or negative return on investments for the network infrastructure owners and operators Site evaluation is a critical step in cellular base station deployments. This evaluation provides insights on the propagation model, inter-site/cell interference, co-channel interference etc. specific to the intended deployment location.

Conventional mobile networks typically place base stations on 30-40 meter standard height towers. To pace with these network operators, several drive testing and cell planning service companies possess well established tools to conduct the necessary site survey and RF parameters evaluation.

However, elevating base stations to greater heights above ground provides improved propagation (ranges of 20-75 km) and presents an opportunity to reduce the total cost of ownership for the network infrastructure operator by deploying fewer elevated base stations to cover the same area. Elevated platforms include (but not limited to) tall towers, aerostats, drones, high-rise buildings and mountains.

Improved propagation range provided by an elevated base station requires the base station to serve greater capacity to satisfy the demand. Elevating base stations well above the surrounding local clutter reduces the angular spread (power azimuth angular spectrum) observed at the base station. Low angular spread opens up opportunity for high order sectorization (HOS) to meet the capacity demands of an elevated base station One of the bottlenecks network operators face in attempting high-elevation deployments is the lack of site survey equipment for larger dimensions (ranges of 20-75 km) of cell coverage. The site survey companies are not yet motivated and geared to conduct R&D to resolve the challenges imposed by these tooling requirements.

It is desirable to have methods, apparatuses, and systems for surveying a site for cellular base station placement.

SUMMARY

An embodiment includes a site survey tool. The site survey tool includes an elevated platform, wherein the elevated platform includes a directionally adjustable beam-forming antenna (such as, an electrically steerable antenna array or a mechanically steerable dish antenna), wherein the elevated platform operates to adjust an elevation of the adjustable beam-forming antenna, and wherein the elevated platform operates to transmit or receive wireless signals while the directionally adjustable beam-forming antenna changes a beam direction. The site survey tool further includes a ground unit, wherein the ground unit operates to adjust to a plurality of locations (x and y coordinates), wherein the ground unit transmits wireless signals to the elevated platform or receives wireless signals from the elevated platform while the directionally adjustable beam-forming antenna changes the beam direction. At least one of the elevated platform or the ground unit measures a signal quality of received wireless signals, and a controller (or processor) operates to estimate a power azimuth angular spectrum of a surveyed site based on a known motion of the adjustable beam-forming antenna, a known beam-forming (radiation) pattern of the adjustable beam-forming antenna, and the measured phase and amplitude of the received wireless signals.

Another embodiment includes a method. The method includes transmitting or receiving, by an elevated platform, wireless signals while a directionally adjustable beam-forming antenna of the elevated platform changes a beam direction, wherein the elevated platform operates to adjust an elevation of the adjustable beam-forming antenna. The method further includes transmitting or receiving, by a ground unit, wireless signals to or from the elevated platform while the directionally adjustable beam-forming antenna changes the beam direction at a plurality of locations of the ground unit. The method further includes measuring, by at least one of the elevated platform or the ground unit a signal quality (both magnitude and phase) of received wireless signals, and estimating a power azimuth angular spectrum of a surveyed site based on a known motion of the adjustable beam-forming antenna, a known beam-forming pattern of the adjustable beam-forming antenna, and the measured phase and amplitude of the received wireless signals.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 1 shows a conventional base station tower and a supercell base station tower, according to an embodiment.

FIG. 7 is a flow chart that includes steps of a method of surveying a site for cellular base station placement, according to an embodiment.

DETAILED DESCRIPTION

Figure 2:
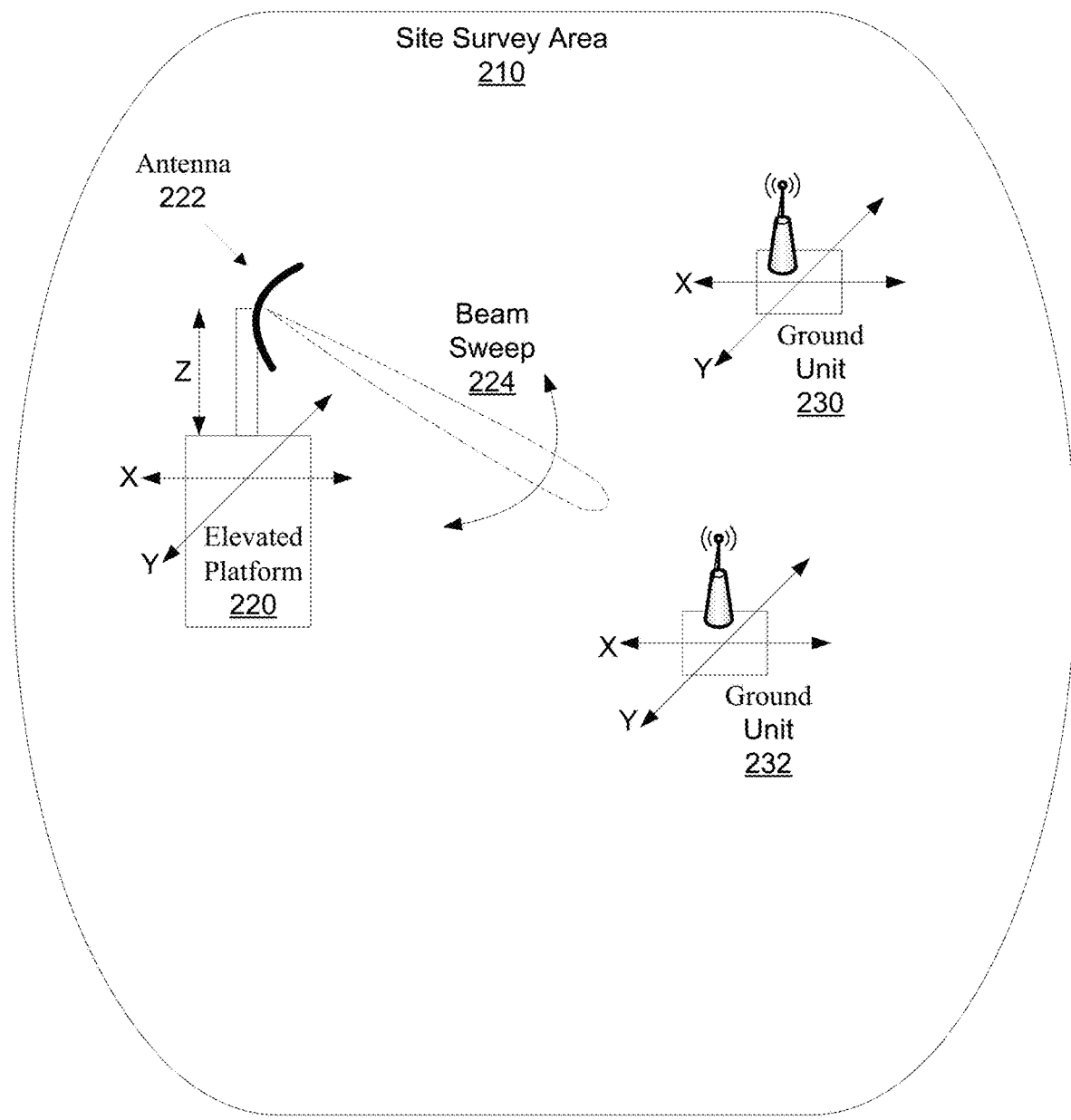
FIG. 2 shows an elevated platform and ground units operating to characterize a site survey area, according to an embodiment.

The embodiments described include methods, apparatuses, and systems for surveying a site for cellular base station placement. Specifically, at least some embodiments includes surveying a site to determine whether the site would benefit from the deployment of a supercell (elevated platform) base station that is taller and covers a substantially greater area than a conventional cellular base station. For at least some embodiments, a supercell base station refers to a long range, high capacity cellular base station mounted on a high elevation platform. For at least some embodiments, the surveying includes evaluating wireless signal propagation and power azimuth angular spectrum (PAS). That is, the surveying assesses the propagation and power azimuth angular spectrum metrics prior to investing in high-elevation long range cellular base stations.

For at least some embodiments, the power azimuth angular spectrum (PAS) for a receiver is defined as a set of angular components of the received signal expressed as power received in various azimuth angles of arrival. Similarly, for at least some embodiments, the PAS for a transmitter is defined as a set of angular components of the transmitted signal expressed as power radiated in various azimuth angles of departure.

FIG. 1 shows conventional base station towers and a supercell base station tower, according to an embodiment. For an embodiment, the standard base stations 110, 111, 112, 113, 114, 115, have a height, and therefore, an antenna elevation of about 30 meters. Further, each of the standard base stations have a cell coverage area 120, 121, 122, 123, 124, 125.

FIG. 1 also shows a super cell base station tower 150 that has a coverage area 151. Elevating base stations to greater heights above ground provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand.

For at least some embodiments, the super cell base station tower 150 maintains a beamforming antenna that is elevated higher than antennas of standard cells. Further, due in part to the larger coverage footprint realized through the elevated beamforming antenna, the super cell base station tower 150 is operable to support higher data capacity that standard cells. For an embodiment, the super cell base station tower 150 utilizes adaptive high-order sectorization. At least some of the described embodiments include surveying sites to determine a level of power azimuth angular spectrum to determine whether the surveyed sites can support adaptive high-order sectorization by determining whether the power azimuth angular spectrum is lower than a threshold. If during the site survey, the power azimuth angular spectrum is determined to be less than a threshold amount, then site is determined to be able to support a super cell base station tower that utilizes the adaptive high-order sectorization.

For greater capacity, the spectral efficiency of the elevated base station 250 is needed since available spectrum is unlikely to change. Techniques such as Massive MIMO (multiple-input, multiple-output), MU-MIMO (multi-user, MIMO) and high order sectorization have been used to improve spectral efficiency. However, the performance of Massive MIMO and MU-MIMO techniques depend greatly on having good quality channel state feedback available at the base station. To obtain the channel state information, channel state estimation preambles are transmitted without the beamforming gain of MU-MIMO through an omnidirectional antenna. However, this means that the propagation range of the base station is fundamentally limited by the range of omni-directional transmission of channel state preambles. Further, the capacity gains of highly sectorized base stations are greatly diluted if the base station is mounted on a standard height tower. The dilution is due to local clutter around the tower creates a large power azimuth angular spectrum which results in significant inter-sector interference between sectors. For an embodiment, a site is surveyed to determine whether the power azimuth angular spectrum of wireless signals within the site are below a threshold, and therefore, that the site can support a large (supercell) base station.

Deployment of tall (supercell) base stations is advantageous because cellular propagation models predict ~6 dB lower path loss upon each doubling of base station height. Further, for an embodiment, as the base station height increases, the clutter if power azimuth angular spectrum of wireless signals decreases. The reduction in the amount of clutter of the power azimuth angular spectrum of communication signals can make adaptive sectoring possible as oppose to short base station that typically suffer from too much cluster of the power azimuth angular spectrum of communication signals to allow for adaptive sectoring.

FIG. 2 shows an elevated platform 220 and ground units 230, 232 operating to characterize a site survey area 210, according to an embodiment. For an embodiment, the elevated platform 220 includes a directionally adjustable beam-forming antenna 222. The elevated platform 220 operates to transmit or receive wireless signals while the directionally adjustable beam-forming antenna 222 changes a beam direction (for example, beam sweep 224) for a plurality of elevations. For an embodiment, the elevated platform 220 further operates to adjust an elevation (z orientation) of the adjustable beam-forming antenna 222, wherein the site survey area 210 can be characterized at multiple of the elevations.

The site survey tool further includes one or more ground units 230, 232. Each of the one or more ground units 230, 232 operates to adjust to a plurality of locations (x and y coordinates). Further, each ground unit 230, 232 transmits wireless signals to the elevated platform 220 or receives wireless signals from the elevated platform 220 while the directionally adjustable beam-forming antenna 222 changes its beam direction.

For at least some embodiments, at least one of the elevated platform 220 or each ground unit 230, 232 measures a signal quality of received wireless signals. For a downlink characterization, for an embodiment, the ground units 230, 232 measure the signal quality. For uplink characterization, for an embodiment, the elevated platform 220 measures the signal quality.

For at least some embodiments, a controller operates to estimate a power azimuth angular spectrum of site survey area 210 based on a known motion of the adjustable beam-forming antenna 222, a known beam-forming pattern of the adjustable beam-forming antenna 222, and measured phase and amplitude of the received wireless signals (at either the ground unit 230, and/or at the elevated platform 220). For an embodiment, the controller is a separate controller that is interfaced with the elevated platform 220 and/or each of the at least one ground unit 230, 232. For other embodiments, the controller in included within the elevated platform 220 and/or the at least one ground unit 230, 232.

For at least some embodiments, for each of a plurality of adjusted elevation settings (that is, for each of multiple settings of the Z orientation of the antenna 222) the elevated platform sweeps 224 the directionally adjustable beam-forming antenna 222 while transmitting or receiving wireless signals, and the ground unit (say ground unit 230) transmits wireless signals to the elevated platform 220 or receives wireless signals from the elevated platform 220 for each of a plurality of locations of the ground unit 230 The controller estimates the power azimuth angular spectrum at each of the plurality of locations of the ground unit 230.

As described, for a given location of the elevated platform 220, the elevated platform 220 sets the elevation (Z orientation) of the directionally adjustable beam-forming antenna 222 and the elevated platform sweeps (changes the beam direction) the beam direction formed by the adjustable beam-forming antenna 222. For each elevation of the directionally adjustable beam-forming antenna 222, receive signals are measured at either the ground unit 230 or at the elevated platform 220. The elevated platform 220 then resets the elevation (Z orientation) of the directionally adjustable beam-forming antenna 222 and the elevated platform again sweeps (changes the beam direction) the beam direction formed by the adjustable beam-forming antenna 222, and the receive signal are again measured for the reset elevation of the directionally adjustable beam-forming antenna 222. For an embodiment, repeating this process yields received signal measurements for each location of the ground unit, for each elevation of the directionally adjustable beam-forming antenna 222, for each location of the of elevated platform.

For at least some embodiments, the elevated platform 220 adjusts the elevation settings of the elevated platform at a plurality of locations of the elevated platform 220, and the controller estimates the power azimuth angular spectrum at each of the plurality of locations of the ground unit (230, 232), for each of the plurality of locations of the elevated platform 220.

For an embodiment, the elevated platform 220 includes a dish antenna (as antenna 222) that is sweep controlled by a gimbal, and the dish antenna (gimballed dish antenna) is mounted on the elevated platform. For an embodiment, the gimballed dish antenna scans −90 to 90 degrees in azimuth direction with a specified angular resolution. For an embodiment, a motor is programmed to perform the scan in a specified field of view.

For an embodiment, the elevated platform 220 includes an antenna array (as antenna 222), wherein the antenna array operates to generate a beam. Further the antenna array electrically sweeps the direction of the beam.

For an embodiment, the ground unit (230, 232) includes an omnidirectional antenna. For a specific embodiment, the ground unit includes a stationary omni-directional antenna placed at near ground (for example, 1.5 meters) height.

For an embodiment, the elevated platform includes and integrated encoder that reads the look angle (direction of the beam formed by the antenna of the elevated platform). Further, for an embodiment, measured data (magnitude and phase) is recorded using a computer API along with the corresponding GPS (or more generally, the absolute time) time stamp on both sides (that is, at the elevated platform and at the ground unit. The data is measured using a VNA (vector network analyzer) that is preset to record absolute magnitude and phase values at a particular frequency.

For an embodiment, the site survey tool (elevated platform 220, ground unit 230) operate to characterizing a downlink channel. For an embodiment, this includes the elevated platform 220 transmitting a continuous-wave single tone radio frequency signal at a preset frequency and at a preset power level while directionally adjustable beam-forming antenna 222 of the elevated platform 220 is changing the beam direction. The ground unit 230 receives and measures the phase and amplitude or the received continuous-wave single tone radio frequency signal. For a specific embodiment for characterizing the downlink, a continuous-wave single RF tone generator is programmed to transmit a preset frequency signal at a specified power level. For an embodiment, the output of the generator is connected to the antenna 222. The received signal on the ground side is routed to a VNA (vector network analyzer). For an embodiment, the magnitude and phase of the received signal is measured, time-synchronized and stored using a computer API. For an embodiment, the ground unit 230 receives and measures the phase and amplitude or the received continuous-wave single tone radio frequency signal and multiple locations within the site survey area 210.

For an embodiment, the site survey tool (elevated platform 220, ground unit 230) operates to characterizing an uplink channel. For an embodiment, this includes the ground unit 230 transmitting a continuous-wave single tone radio frequency signal at a preset frequency and at a preset power level, and the elevated platform 220 receiving and measuring phase and amplitude or the received continuous-wave single tone radio frequency signal while directionally adjustable beam-forming antenna of the elevated platform is changing the beam direction. For a specific embodiment of characterizing the uplink, similar RF continuous-wave single tone generator is programmed to transmit a preset frequency signal at a specified power level. For an embodiment, the output of the generator is connected to an omni antenna of the ground unit 230. For an embodiment, the received signal on the elevated platform 220 is routed to a portable VNA. For an embodiment, the magnitude and phase of the received signal is measured, time-synchronized and stored using a computer API. For an embodiment, the elevated platform 220 receives and measures the phase and amplitude or the received continuous-wave single tone radio frequency signal and multiple locations within the site survey area 210

For an embodiment, the uplink and downlink characterizations can either be set to operate on two non-overlapping frequency bands (FDD) or time disciplined to operate in the same band (TDD).

For an embodiment, data generated by the receiving and measuring of the signals is repeated for several look angles (direction of the beam formed by the antenna of the elevated platform 220). For an embodiment, a link budget analysis shows that a resolution of 0.5 degrees (of the beam direction) with a dwell time per look angle as 5 seconds is sufficient to average out the received samples at ranges of 40 km. This consumes 30 minutes for a −90 to 90 degree azimuth sweep. For this embodiment, the transmit power is assumed to be 46 dBm (commercially available). A parabolic dish antenna can readily provide a peak gain of 24-30 dBi and a dipole omni antenna can provide additional 3-6 dBi. For an embodiment, the measured data is then post-processed to yield pathloss and power azimuth angular spectrum.

Figure 3:
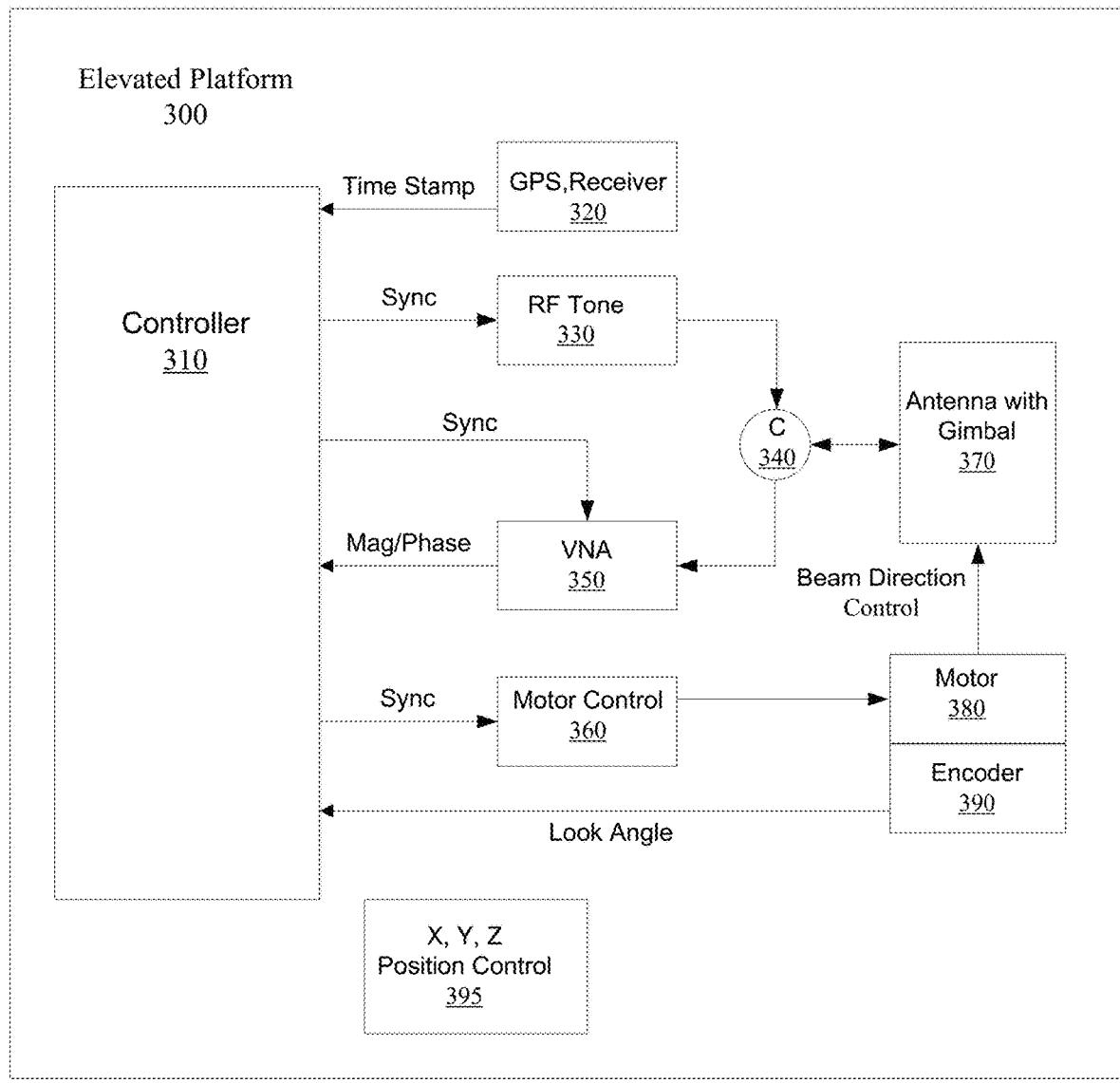
FIG. 3 shows a block diagram of an elevated platform, according to an embodiment.

FIG. 3 shows a block diagram of an elevated platform 300, according to an embodiment. As shown, the elevated platform 300 includes an antenna with gimbal 370 which generates a beam that is adjustably directed. For an embodiment, the beam sweeps over various directions. While shown and described as a dish antenna with gimbal control, the antenna of the elevated platform 300 can be implemented with other types of equivalent antennas.

For an embodiment, the beam includes a transmit signals, which is generated by an RF (radio frequency) tone source 330 and is provided to the antenna with gimbal 370 through a circulator 340. As previously described, for an embodiment, RF tone source 330 generates a continuous-wave single RF tone, and the RF tone source 330 is programmed to transmit a preset frequency signal at a specified power level.

For an embodiment, the elevated platform 300 includes a GPS (global positioning system) receiver in order for the elevated platform 300 to determine its location, and to obtain a time stamp which allows for synchronization in post-processing. For an embodiment, a controller 310 receives the time stamp, and provides the RF tone source 330 with a sync (synchronization) signal for providing synchronization of the RF tone generated by the RF tone source 330.

For an embodiment, the sync is also provided to a motor controller 360 that controls a motor 380 that controls the direction of the beam of the antenna with gimbal 370. A ground unit then measures the phase and amplitude of a received signal. For a location and elevation of the elevated platform, and a location of the ground unit, a controller (this controller can be an external controller, or can be at least partially the controller 310) operates to estimate a power azimuth angular spectrum of a surveyed site based on a known motion of the adjustable beam-forming antenna (antenna with gimbal 370), a known beam-forming pattern of the adjustable beam-forming antenna (antenna with gimbal 370), and measurements of phase and amplitude of the received wireless signals. The sync signal, the beam direction control, and knowledge of the adjustable beam-forming antenna allow for determination of the motion of the adjustable beam-forming antenna (antenna with gimbal 370), a known beam-forming pattern of the adjustable beam-forming antenna (antenna with gimbal 370).

For an embodiment, the location and elevation of the elevated platform 300 is monitored and/or controlled during the surveying of the site survey area. The elevated platform 300 includes position control 395 that sets and/or monitors the location and elevation of the elevated platform 300.

For an embodiment, the antenna with gimbal 370 of the elevated platform 300 receives wireless signals from a ground unit while the antenna with gimbal 370 is adjusting a direction of a beam formed by the antenna with gimbal 370. The ground unit transmitted signals are received through the antenna with gimbal 370 and provided to a VNA (vector network analyzer) 350 through the circulator 340. The VNA 350 provides a measured magnitude and phase of the received signal to the controller 310. Again, a controller (this controller can be an external controller, or can be at least partially the controller 310) operates to estimate a power azimuth angular spectrum of a surveyed site based on a known motion of the adjustable beam-forming antenna (antenna with gimbal 370), a known beam-forming pattern of the adjustable beam-forming antenna (antenna with gimbal 370), and measured phase and amplitude of the received wireless signals.

An encoder 390 provides the controller 310 with a look angle (the angular direction of the beam formed by the directionally beam formed antenna).

As previously described, the antenna 370 is a directionally controlled beam-forming antenna that can be implemented with an antenna array that electrically controls the direction of the antenna, or with a dish antenna and gimbal as shown in FIG. 3.

Figure 4:
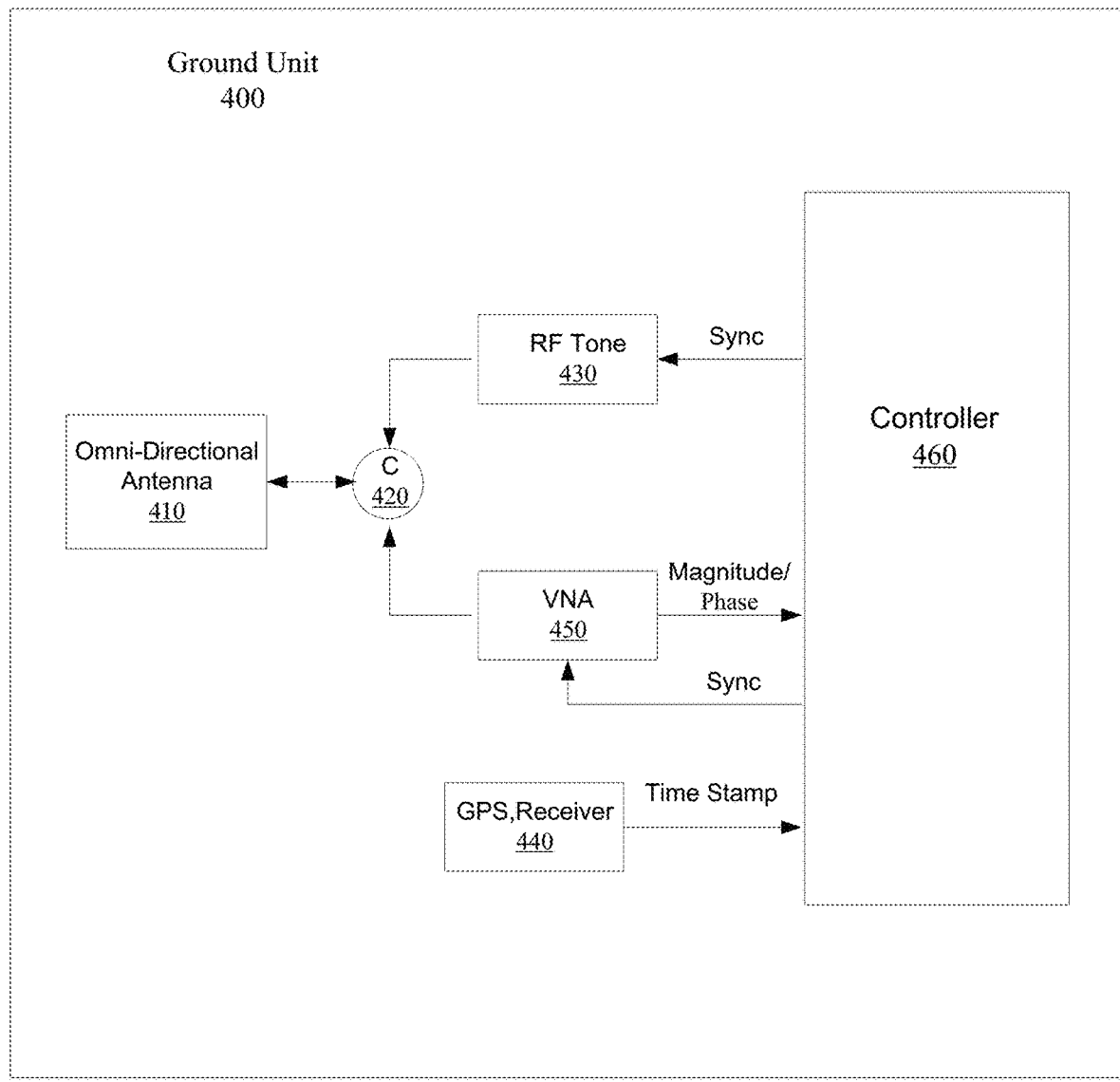
FIG. 4 shows a block diagram of a ground unit, according to an embodiment.

FIG. 4 shows a block diagram of a ground unit 400, according to an embodiment. For an embodiment, the ground unit 400 includes an omni-directional antenna 410. When receiving a wireless signal from the elevated platform 300, the omni-directional antenna 410 provides the received wireless signal to a VNA 450 through a circulator 420 which measures the magnitude and phase of the received signal which are provided to a controller 460. Again, a controller (this controller can be an external controller, or can be at least partially the controller 460) operates to estimate a power azimuth angular spectrum of a surveyed site based on a known motion of the adjustable beam-forming antenna (antenna with gimbal 370), a known beam-forming pattern of the adjustable beam-forming antenna (antenna with gimbal 370), and measure phase and amplitude of the received wireless signals.

For an embodiment, the ground unit 400 includes a GPS receiver 440 for providing a location of the ground unit 400, and for providing a time stamp. The controller 460 receives the time stamp. Utilizing the time stamp, the controller 460 provides sync signals to both the VNA 450 and an RF tone generator 430. Note that for an embodiment, both the elevated platform 300 and the ground unit 400 are synchronized to a GPS signal.

For an embodiment, the RF tone generator 430 transmits a continuous-wave single tone radio frequency signal at a preset frequency and at a preset power level, and the elevated platform 300 receives and measures phase and amplitude of the received continuous-wave single tone radio frequency signal while directionally adjustable beam-forming antenna of the elevated platform 300 is changing the beam direction. Again, a controller (this controller can be an external controller, or can be at least partially the controller 460) operates to estimate a power azimuth angular spectrum of a surveyed site based on a known motion of the adjustable beam-forming antenna (antenna with gimbal 370), a known beam-forming pattern of the adjustable beam-forming antenna (antenna with gimbal 370), and measure phase and amplitude of the received wireless signals.

Figure 5A:
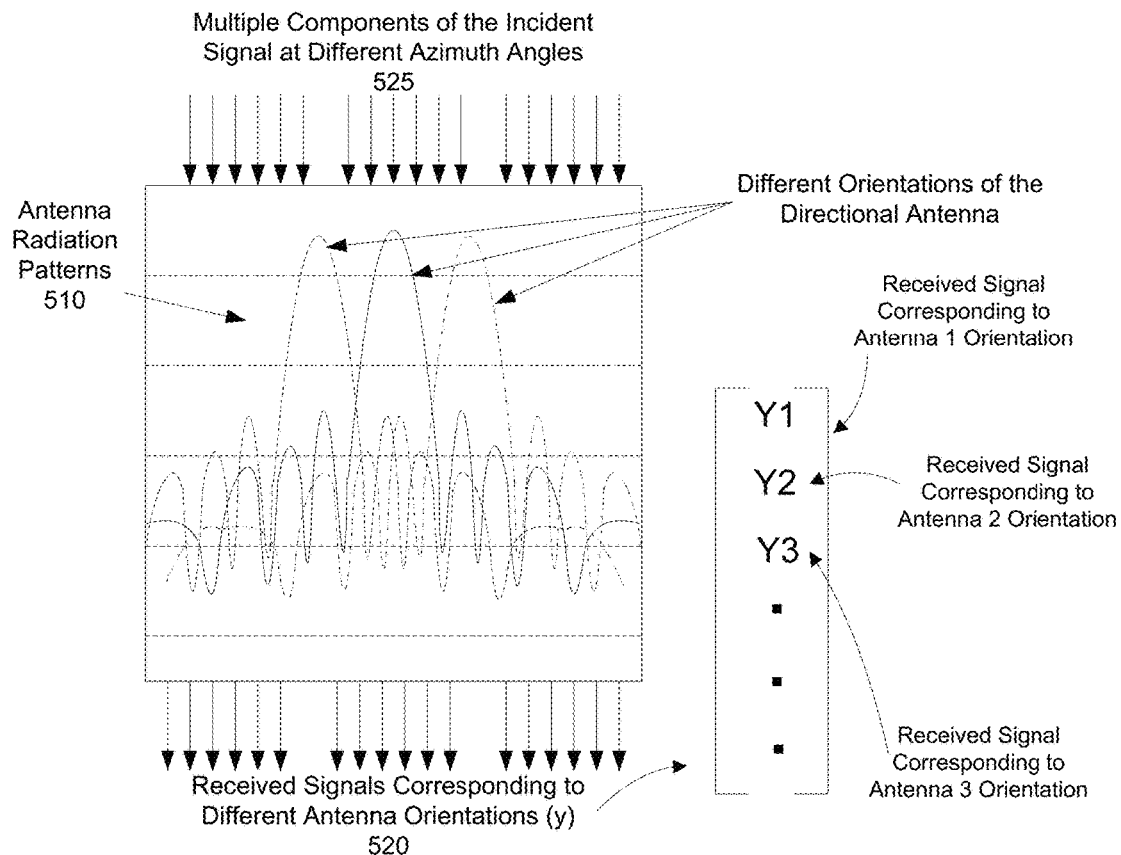
FIG. 5A shows radiation patterns of three different exemplary orientations of the directional antenna mounted on the elevated platform, according to an embodiment.

FIG. 5A shows radiation patterns 510 of three different exemplary orientations of the directional antenna mounted on the elevated platform, according to an embodiment. The x-axis in FIG. 5A is azimuth angle and y-axis is the antenna gain in a given azimuth direction. FIG. 5A also shows the how the impinging rays of the receiving signal from various azimuth directions are combined by the antenna. That is, FIG. 5A includes multiple components of the incident signal at the different azimuth angles 525 (that is, the signal incident to the adjustable beam-forming antenna). The incident signals include both an amplitude and a phase. Further, the PAS (power azimuth angular spectrum) is a property of the incident signal, which needs to be determined by processing of the received signals. FIG. 5A also shows received field measurements ($y_m$) 520 which represent the incident signal 525 having been received through the beam-forming antenna and different orientations of the directional antenna.

The PAS signal can be determine through known motion (based on the elements of "Y, or $y_k$) of the adjustable beam-forming antenna, the known beam-forming patterns 510 of the adjustable beam-forming antenna, and the measured phase and amplitude of the received wireless signals (Y).

A mathematical analysis shows that power azimuth spectrum is circularly convolved with the complex antenna pattern. For the analysis, 'g' is the antenna pattern, '$\alpha_k$' and '$\theta_k$' are the resulting magnitude and phase change for the 'k'th path. '$a_{tx}$' is the transmit amplitude, '$n_m$' is the measurement noise and '$y_m$' is the measured data.

The received field measurements $$y_m = a_{tx} \sum_{k=1}^{360} \alpha_k e^{j\theta_k} g_{(k-m)360} + n_m = a_{tx} \sum_{k=1}^{360} p_k g_{(k-m)360} + n_m$$

In this case, $p_k = \alpha_k e^{j\theta_k}$ can be estimated by performing frequency domain estimation. For accurate estimation of Azimuth Spectrum $\alpha_{tx}$ needs to be sufficiently high, and a high-resolution radiation pattern and RSSI measurements should be obtained.

For at least some embodiments, based on the received power levels (of $y_m$), the pathloss can be estimated, and the PAS can be estimated. The results can be curve fitted to either a Gaussian or Laplacian model to calculate the power azimuth angular spectrum.

Figure 5B:
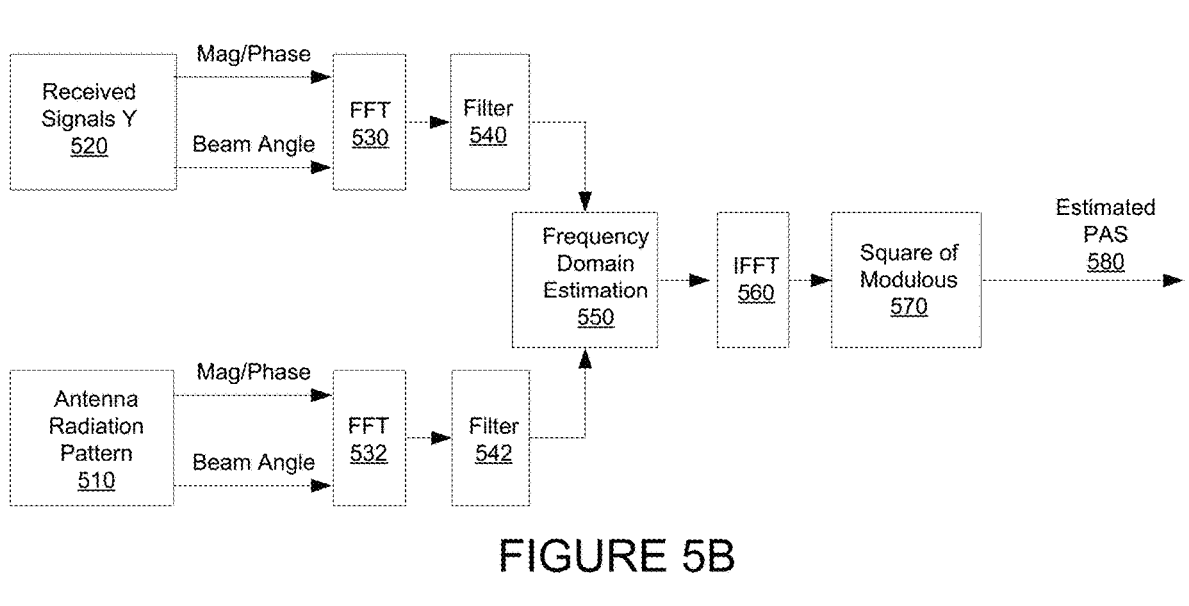
FIG. 5B shows a block diagram of processing of received signal (both magnitude and phase, $y_m$) and known antenna complex radiation pattern ($g_m$) for generating a power azimuth angular spectrum (square of modulus of $\alpha_m$), according to an embodiment.

FIG. 5B shows a block diagram of processing of received signal (both magnitude and phase, $y_k$) and known antenna complex radiation pattern ($g_k$) for generating a power azimuth angular spectrum (square of modulus of $\alpha_k$), according to an embodiment. For an embodiment, this is generated by transforming $y_k$ and $g_k$ to the frequency domain and performing a frequency domain estimation of $\alpha_k$. The transformation to frequency domain is achieved by performing a Fast Fourier Transform (FFT) operation. After the estimation, for an embodiment, the resulting frequency domain $\alpha_k$ is transformed back to time domain by performing Inverse Fast Fourier Transform (IFFT). The square of the modulus of the resulting signal from the IFFT block yields the PAS.

The processing includes accessing the received field measurements 520 and the antenna radiation pattern 510 which both includes a magnitude, phase, and a beam angle (that is, the direction of the beam formed by the beam-forming antenna). Both the received field measurements 520 and the antenna radiation pattern 510 are converted into the frequency domain by FFT(s) (fast Fourier transforms) 530, 532. Next, FFT samples are filtered 540, 542 by removing the samples that are of a zero or near-zero value, which may be referred to as frequency domain windowing. That is, the zero samples are removed from the FFT samples of the radiation pattern, and then the corresponding samples are removed from the FFT samples of the received field measurements. Next, a frequency domain estimation 550 is performed. For an embodiment, the frequency domain estimation 550 includes dividing the measured or received samples (FFT samples) by the known antenna pattern samples (FFT samples).

For an embodiment, the frequency domain estimation is then transformed back to the time domain by performing an IFFT (inverse fast Fourier transform) 560. The resulting signal after 560 is complex valued. That is, the resulting signal after 560 has both a magnitude and a phase.

A square of the modulus 570 is performed on the resulting signal after 560 generating the PAS 580. The resulting signal after 560 is complex valued having both magnitude and phase. In order to express the power of the signal can be expressed by squaring the modulus of the complex number.

Figure 6:
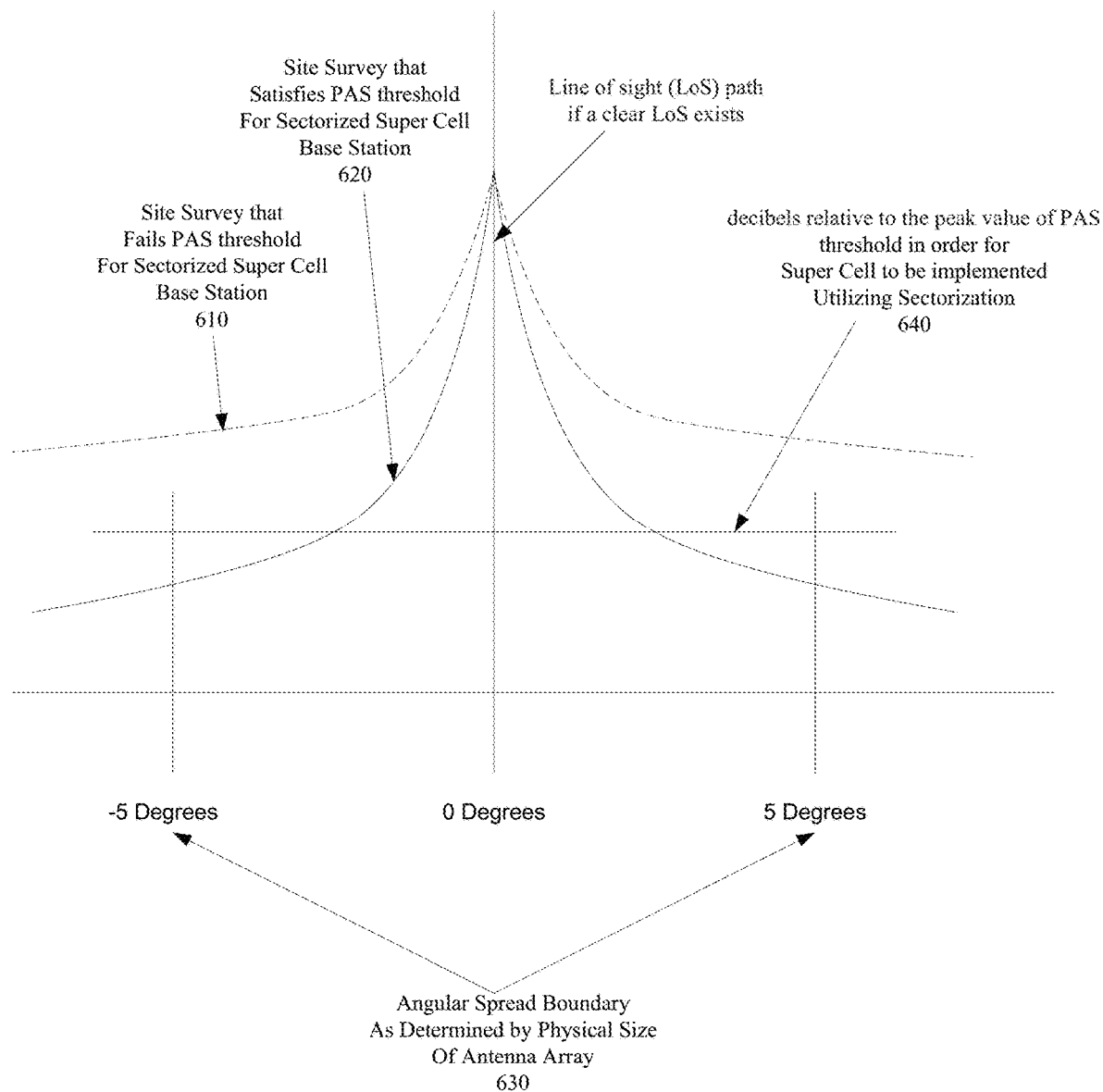
FIG. 6 shows power azimuth spectrums generated from site surveys that can be used to determine whether the sites support deployment of a super cell base station, according to an embodiment.

FIG. 6 shows power azimuth spectrums 610, 620 generated from site surveys that can be used to determine whether the sites support deployment of a super cell base station, according to an embodiment. For an embodiment, an angular spread boundary 630 is defined by a physical size of an antenna array of the super cell base station. Generally, the larger the physical size of the antenna array, the smaller the narrowest beam size that can be generated by the antenna array. For an embodiment, the narrowest beam size of the antenna array defines the angular spread boundary 630. The exemplary angular spread boundary 630 of FIG. 6 is plus or minus 5 degrees. For at least some embodiment, azimuth spread is defined as a measure that is used to quantify the amount of variation or dispersion of the set of power values that constitute the PAS, expressed in the units of degrees.

As shown, a decibels relative to the peak value of PAS threshold 640 is shown, in which the power azimuth angular spectrum of the site must be lower than in order for the site to be able to support deployment of a super cell base station that utilizes adaptive sectorization. As shown, the curve 610 of the power azimuth angular spectrum for a first site survey has values above the threshold 640 at the angular spread boundaries 630, and therefore, has a surveyed performance of power azimuth angular spectrum that does not supports a super cell base station that includes adaptive sectorization. Further, as shown, the curve 620 of the power azimuth angular spectrum for a second site survey has values below the threshold 640 at the angular spread boundaries 630, and therefore, has a surveyed performance of power azimuth angular spectrum that supports a super cell base station that includes adaptive sectorization.

For at least some embodiments, the described site survey processes are performed over a prospective site. Based on whether the power azimuth spectrums generated by the survey are better or worse than a determined threshold, the site can be determined to be able to support or not support the deployment of a super cell base station that includes adaptive sectorization. Alternatively, a site survey of a site is performed, and a power azimuth spectrum is generated by the survey. Based on the generated power azimuth spectrum, and size of an antenna array of a super cell base station that would yield an angular spread boundary that would result in the power azimuth spectrum being below the threshold can be determined. That is, the larger the antenna array, the smaller the angular spread boundary. If the antenna array is larger, the beamwidth is smaller. Therefore the acceptable PAS threshold is more stringent.

FIG. 7 is a flow chart that includes steps of a method of surveying a site for cellular base station placement, according to an embodiment. A first step 710 includes transmitting or receiving, by an elevated platform, wireless signals while a directionally adjustable beam-forming antenna of the elevated platform changes a beam direction, wherein the elevated platform operates to adjust an elevation of the adjustable beam-forming antenna. A second step 720 includes transmitting or receiving, by a ground unit, wireless signals to or from the elevated platform while the directionally adjustable beam-forming antenna changes the beam direction at a plurality of locations of the ground unit. A third step 730 includes measuring, by at least one of the elevated platform or the ground unit a signal quality of received wireless signals. A fourth step 740 includes estimating a power azimuth angular spectrum of a surveyed site based on a known motion of the adjustable beam-forming antenna, a known beam-forming pattern of the adjustable beam-forming antenna, and the measured phase and amplitude of the received wireless signals.

For at least some embodiments, for each of a plurality of adjusted elevation settings of the elevated platform the directionally adjustable beam-forming antenna sweeps (changes beam directions) while transmitting or receiving wireless signals, and the ground unit transmits wireless signals to the elevated platform or receives wireless signals from the elevated platform for each of a plurality of locations of the ground unit, and the controller estimates the power azimuth angular spectrum at each of the plurality of locations of the ground unit. Further, for at least some embodiments, the elevated platform adjusts the elevation settings of the elevated platform at a plurality of locations, and the controller estimates the power azimuth angular spectrum at each of the plurality of locations of the ground unit, for each of the plurality of locations of the elevated platform.

For an embodiment, the controller operating to estimate the power azimuth angular spectrum of the surveyed site based on the known motion of the adjustable beam-forming antenna, the known beam-forming pattern of the adjustable beam-forming antenna, and the measured phase and amplitude of the received wireless signals includes transforming values of the measured phase and amplitude of the received wireless signals and the known beam-forming pattern into a frequency domain, performing a power azimuth angular spectrum estimation in the frequency domain, and transforming the estimated power azimuth angular spectrum back to a time domain. For at least some embodiments, the controller performing the power azimuth angular spectrum estimation in the frequency domain, includes removing frequency domain samples of the known beam-forming pattern having zero values, removing frequency domain samples of the measured phase and amplitude of the received wireless signals that correspond with the removed frequency domain samples of the known beam-forming pattern, dividing the frequency domain samples of the measured phase and amplitude of the received wireless signals with the frequency domain samples of the known beam-forming pattern for a frequency bin of each sample after removing the frequency domain samples.

For a specific embodiment, the controller operating to estimate the power azimuth angular spectrum of the surveyed site based on the known motion of the adjustable beam-forming antenna, the known beam-forming pattern of the adjustable beam-forming antenna, and the measured phase and amplitude of the received wireless signals includes estimating the power azimuth angular spectrum, including determining an FFT (fast Fourier transform) of the measured phase and amplitude of the received wireless signals, determining an FFT of an antenna radiation pattern of the adjustable beam-forming antenna, frequency domain windowing the FFT of the measured phase and amplitude of the received wireless signals, frequency domain windowing the FFT of an antenna radiation pattern of the adjustable beam-forming antenna, frequency domain estimating the frequency domain windowing the FFT of the measured phase and amplitude and the frequency domain windowing the FFT of an antenna radiation pattern, and determining and IFFT (inverse fast Fourier transform) of the frequency domain estimate.

For at least some embodiments, the elevated platform includes a dish antenna that is sweep controlled by a gimbal, and the dish antenna is mounted on the elevated platform. For at least some embodiments, the ground unit includes an omnidirectional antenna.

At least some embodiments further include characterizing a downlink comprising the elevated platform transmitting a continuous-wave single tone radio frequency signal at a preset frequency and at a preset power level while directionally adjustable beam-forming antenna of the elevated platform is changing the beam direction, and the ground unit receiving and measuring phase and amplitude or the received continuous-wave single tone radio frequency signal.

At least some embodiments further include characterizing a uplink comprising the ground unit transmitting a continuous-wave single tone radio frequency signal at a preset frequency and at a preset power level, and the elevated platform receiving and measuring phase and amplitude or the received continuous-wave single tone radio frequency signal while directionally adjustable beam-forming antenna of the elevated platform is changing the beam direction.

Figure 8:
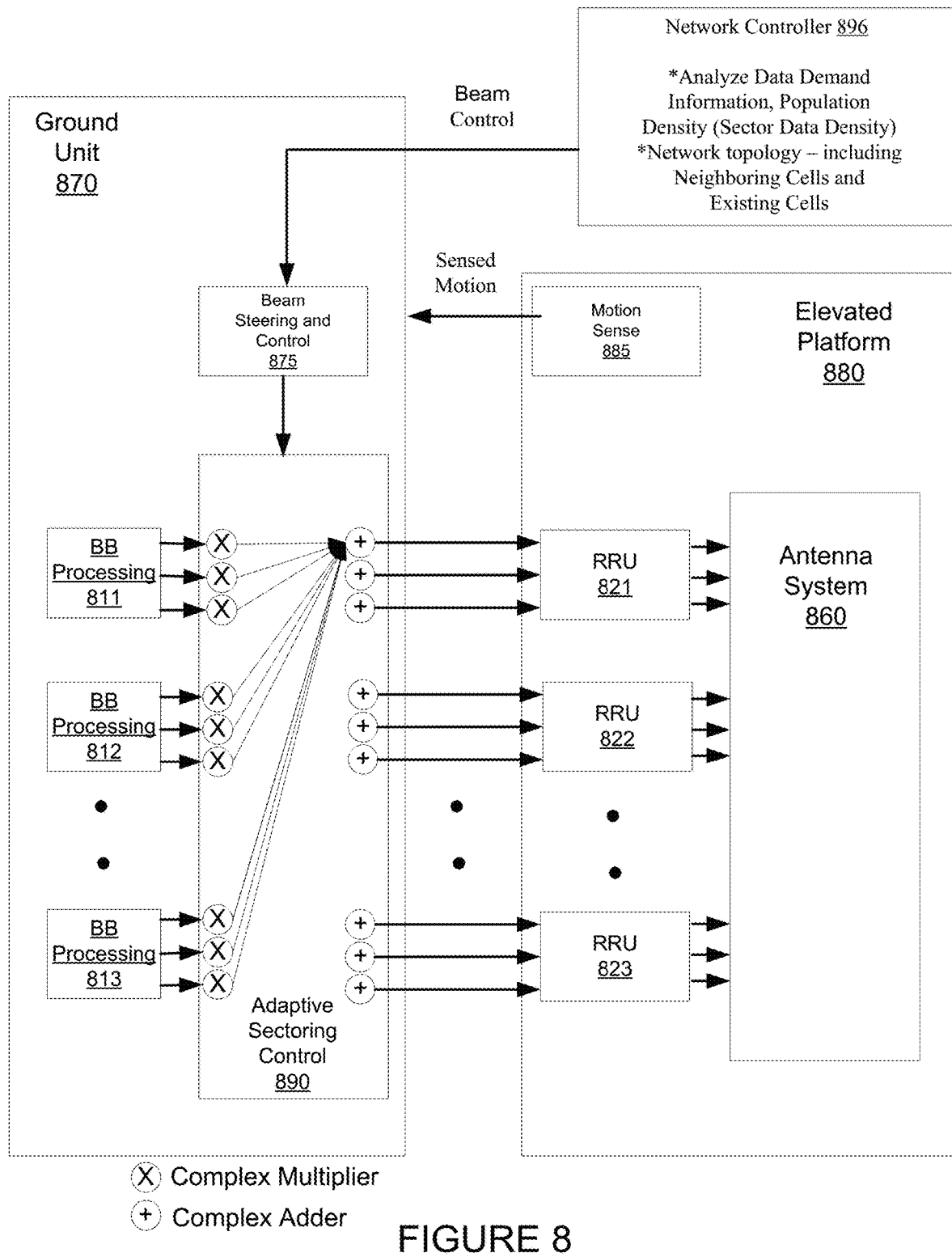
FIG. 8 shows an architecture of a base station that includes an on ground portion and an elevated platform portion, according to an embodiment.

FIG. 8 shows an architecture of a base station that includes an on-ground portion (ground unit 870) and an elevated platform portion (elevated platform 880), according to an embodiment. As previously described, for at least some embodiments, elevating base stations well above the surrounding local clutter reduces the angular spread observed at the base stations. If the angular spread is maintain below a threshold, then the described embodiments of sectorizing the coverage area of the cell formed by a base station becomes an option which can be used to meet the capacity demands of the larger cell. Further, for at least some embodiments, the base station is adapted to handle heterogeneous demand in different angular sectors. That is, the data demand of the different sectors can be very different, and the sectors are adaptively adjusted to handle the varying demands of the different sectors. Further, for at least some embodiments, the base station adaptively evolves as the demand profile changes as a function of time.

For at least some embodiments, the base station (supercell base station) includes tall towers that include guide wireless to provide stability of the tall towers. For at least some embodiments, the base station (supercell base station) air borne tethered structures which elevate the base stations to greater heights above ground level. These embodiments of platforms can achieve base station elevations up to 200-500 meters at a reasonable cost. For at least some embodiments, these platforms are connected to the ground and rely on ground generated power to power the high-order sectoring elevated base station.

As shown, for an embodiment, the ground unit 870 includes a plurality base band processing units 811, 812, 813 that provide base band processing of transmit and receive signals.

Further, as shown, for an embodiment, the base band processing units 811, 812, 813 are connected to an adaptive sectoring control unit 890. For an embodiment, adaptive sectoring control unit 890 includes a plurality of complex multipliers and complex adders which delay, scale, and sum the communication signals for forming beams of different sectors of the base station. This includes setting the direction and/or the widths of beams for each of the sectors of the base station.

Further, as shown, for an embodiment, the adaptive sectoring control unit 890 receives control from a beam steering and control unit 875. The beam steering and control unit 875 provide adaptive adjustment of the adaptive sectoring control unit 890 to provide the adaptive sectoring of the base station. This includes setting the beam directions and beam widths of beams formed for each of the different sectors of the base station.

Further, as shown, for an embodiment, the beam steering and control unit 875 can receive one or more control inputs that enable the beam steering and control unit 875 to adaptively control the sectorization of the base station. Exemplary inputs include one or more of a sector data density input, an existing cell input, neighboring cell input, and/or motion sensed by a motion sensor 885 of the base station. As shown, for an embodiment, an external controller 896 provides a beam control for the beam steering and control unit 875. For an embodiment, the external controller 896 utilizes a network topology to at least partially control the sectorization of the base station by controlling the beam control of the beam steering and control unit 875 based on data demand and population density (sector data density), neighboring cells, and/or existing cells. That is, for an embodiment, the external controller 896 combines each of the sector data density, neighboring cells, and/or existing cells and generates the beam control. For an embodiment, the combination of the sector data density, neighboring cells, and/or existing cells are combined to provide the beam control. For an embodiment, the combination includes a weighted combination, in which the weighting can adapt over time.

For an embodiment, the sectorization includes multiple remote radio units (RRUs) 821, 822, 823 to be used on the elevated platform 880 of the elevated base station. The RRUs 821, 822, 823 are connected to an antenna system 860 of the elevated platform 880.

Although specific embodiments have been described and illustrated, the embodiments are not to be limited to the specific forms or arrangements of parts so described and illustrated. The described embodiments are to only be limited by the claims.

What is claimed:

1. A site survey tool, comprising:
   an elevated platform comprising a directionally adjustable beam-forming antenna, and operates to adjust an elevation (z coordinate) of the adjustable beam-forming antenna;
   a ground unit that operates to adjust to a plurality of locations (x and y coordinates);
   wherein for each of a plurality of adjusted elevation settings (z coordinate) of the elevated platform the directionally adjustable beam-forming antenna changes beam directions while transmitting or receiving wireless signals, and the ground unit transmits wireless signals to the elevated platform or receives wireless signals from the elevated platform for each of the plurality of locations of the ground unit;
   wherein at least one of the elevated platform or the ground unit measures a phase and amplitude of received wireless signals for each of the plurality of locations of the ground unit;
   wherein a controller operates to estimate a power azimuth angular spectrum at each of the plurality of locations of the ground unit of a surveyed site based on a known motion of the adjustable beam-forming antenna, a known beam-forming pattern of the adjustable beam-forming antenna, and the measured phase and amplitude of the received wireless signals.

2. The site survey tool of claim 1, wherein the elevated platform adjusts the elevation settings of the elevated platform at a plurality of locations, and the controller estimates the power azimuth angular spectrum at each of the plurality of locations of the ground unit, for each of the plurality of locations of the elevated platform.

3. The site survey tool of claim 1, wherein the controller operating to estimate the power azimuth angular spectrum of the surveyed site based on the known motion of the adjustable beam-forming antenna, the known beam-forming pattern of the adjustable beam-forming antenna, and the measured phase and amplitude of the received wireless signals comprises:
   transforming values of the measured phase and amplitude of the received wireless signals and the known beam-forming pattern into a frequency domain;
   performing a power azimuth angular spectrum estimation in the frequency domain; and
   transforming the estimated power azimuth angular spectrum back to a time domain.

4. The site survey tool of claim 3, wherein the controller performing the power azimuth angular spectrum estimation in the frequency domain, comprises:
   removing frequency domain samples of the known beam-forming pattern having zero values;
   removing frequency domain samples of the measured phase and amplitude of the received wireless signals that correspond with the removed frequency domain samples of the known beam-forming pattern;
   dividing the frequency domain samples of the measured phase and amplitude of the received wireless signals with the frequency domain samples of the known beam-forming pattern for a frequency bin of each sample after removing the frequency domain samples.

5. The site survey tool of claim 1, wherein the controller operating to estimate the power azimuth angular spectrum of the surveyed site based on the known motion of the adjustable beam-forming antenna, the known beam-forming pattern of the adjustable beam-forming antenna, and the measured phase and amplitude of the received wireless signals comprises:
   estimating the power azimuth angular spectrum, comprising:
      determining an FFT (fast Fourier transform) of the measured phase and amplitude of the received wireless signals;
      determining an FFT of an antenna radiation pattern of the adjustable beam-forming antenna;
      frequency domain windowing the FFT of the measured phase and amplitude of the received wireless signals;
      frequency domain windowing the FFT of an antenna radiation pattern of the adjustable beam-forming antenna;
      frequency domain estimating the frequency domain windowing the FFT of the measured phase and amplitude and the frequency domain windowing the FFT of an antenna radiation pattern; and
      determining and IFFT (inverse fast Fourier transform) of the frequency domain estimate.

6. The site survey tool of claim 1, wherein the elevated platform comprises a dish antenna that is sweep controlled by a gimbal, and the dish antenna is mounted on the elevated platform.

7. The site survey tool of claim 1, wherein the ground unit comprises an omnidirectional antenna.

8. The site survey tool of claim 1, further comprising characterizing a downlink comprising the elevated platform transmitting a continuous-wave single tone radio frequency signal at a preset frequency and at a preset power level while directionally adjustable beam-forming antenna of the elevated platform is changing the beam direction, and the ground unit receiving and measuring phase and amplitude or the received continuous-wave single tone radio frequency signal.

9. The site survey tool of claim 1, further comprising characterizing a uplink comprising the ground unit transmitting a continuous-wave single tone radio frequency signal at a preset frequency and at a preset power level, and the elevated platform receiving and measuring phase and amplitude or the received continuous-wave single tone radio frequency signal while directionally adjustable beam-forming antenna of the elevated platform is changing the beam direction.

10. A method, comprising:
    transmitting or receiving, by an elevated platform, wireless signals while a directionally adjustable beam-forming antenna of the elevated platform changes a beam direction;
    transmitting or receiving, by a ground unit, wireless signals to or from the elevated platform;
    wherein for each of a plurality of adjusted elevation (z coordinate) settings of the elevated platform the directionally adjustable beam-forming antenna changes beam directions while transmitting or receiving wireless signals, and the ground unit transmits wireless signals to the elevated platform or receives wireless signals from the elevated platform for each of a plurality of locations (x and v coordinates) of the ground unit;
    measuring, by at least one of the elevated platform or the ground unit a phase and amplitude of received wireless signals; and
    estimating a power azimuth angular spectrum at each of the plurality of locations of the ground unit of a surveyed site based on a known motion of the adjustable beam-forming antenna, a known beam-forming pattern of the adjustable beam-forming antenna, and the measured phase and amplitude of the received wireless signals.

11. The method of claim of claim 10, wherein the elevated platform adjusts the elevation settings of the elevated platform at a plurality of locations, and the controller estimates the power azimuth angular spectrum at each of the plurality of locations of the ground unit, for each of the plurality of locations of the elevated platform.

12. The method of claim 10, further comprising:
    estimating the power azimuth angular spectrum of the surveyed site based on the known motion of the adjustable beam-forming antenna, the known beam-forming pattern of the adjustable beam-forming antenna, and the measured phase and amplitude of the received wireless signals comprising:
    transforming values of the measured phase and amplitude of the received wireless signals and the known beam-forming pattern into a frequency domain;
    performing a power azimuth angular spectrum estimation in the frequency domain; and
    transforming the estimated power azimuth angular spectrum back to a time domain.

13. The method of claim 12, wherein performing the power azimuth angular spectrum estimation in the frequency domain, comprises:
    removing frequency domain samples of the known beam-forming pattern having zero values;
    removing frequency domain samples of the measured phase and amplitude of the received wireless signals that correspond with the removed frequency domain samples of the known beam-forming pattern;
    dividing the frequency domain samples of the measured phase and amplitude of the received wireless signals with the frequency domain samples of the known beam-forming pattern for a frequency bin of each sample after removing the frequency domain samples.

14. The method of claim 10, wherein estimating the power azimuth angular spectrum of the surveyed site based on the known motion of the adjustable beam-forming antenna, the known beam-forming pattern of the adjustable beam-forming antenna, and the measured phase and amplitude of the received wireless signals comprises:
    estimating the power azimuth angular spectrum, comprising:
        determining an FFT (fast Fourier transform) of the measured phase and amplitude of the received wireless signals;
        determining an FFT of an antenna radiation pattern of the adjustable beam-forming antenna;
        frequency domain windowing the FFT of the measured phase and amplitude of the received wireless signals;
        frequency domain windowing the FFT of an antenna radiation pattern of the adjustable beam-forming antenna;
        frequency domain estimating the frequency domain windowing the FFT of the measured phase and amplitude and the frequency domain windowing the FFT of an antenna radiation pattern; and
        determining and IFFT (inverse fast Fourier transform) of the frequency domain estimate.

15. The method of claim 10, wherein the elevated platform comprises a dish antenna that is sweep controlled by a gimbal, and the dish antenna is mounted on the elevated platform.

16. The method of claim 10, wherein the ground unit comprises an omnidirectional antenna.

17. The method of claim 10, further comprising:
    characterizing a downlink comprising the elevated platform transmitting a continuous-wave single tone radio frequency signal at a preset frequency and at a preset power level while directionally adjustable beam-forming antenna of the elevated platform is changing the beam direction, and the ground unit receiving and measuring phase and amplitude or the received continuous-wave single tone radio frequency signal.

18. The method of claim 10, further comprising:
    characterizing a uplink comprising the ground unit transmitting a continuous-wave single tone radio frequency signal at a preset frequency and at a preset power level, and the elevated platform receiving and measuring phase and amplitude or the received continuous-wave single tone radio frequency signal while directionally adjustable beam-forming antenna of the elevated platform is changing the beam direction.

* * * * *